United States Patent [19]
Uang

[11] Patent Number: 5,445,700
[45] Date of Patent: Aug. 29, 1995

[54] LAMINATOR

[75] Inventor: M. S. Uang, Chung City, Taiwan

[73] Assignee: Favpem Enterprise Co., Ltd., San Chung City, Taiwan

[21] Appl. No.: 332,801

[22] Filed: Nov. 2, 1994

[51] Int. Cl.$^6$ .......................................... B32B 31/20
[52] U.S. Cl. ........................... 156/359; 156/555; 156/583.1; 374/141; 374/208; 219/469
[58] Field of Search ............ 156/359, 555, 583.1; 374/141, 179, 208; 219/216, 469, 470, 471, 388; 355/289, 290

[56]  References Cited
U.S. PATENT DOCUMENTS

| | | | |
|---|---|---|---|
| 3,027,285 | 3/1962 | Eisner et al. | 156/555 X |
| 3,840,420 | 10/1973 | Sarcia | 156/359 X |
| 3,901,758 | 8/1975 | Humphries | 156/555 X |
| 5,232,538 | 8/1993 | Liu | 156/359 |
| 5,275,684 | 1/1994 | Marazzi et al. | 156/359 |

Primary Examiner—David A. Simmons
Assistant Examiner—J. Sells
Attorney, Agent, or Firm—Bacon & Thomas

[57]  ABSTRACT

An improved laminator includes two heat conductors each having a roller channel receiving a silicone roller and a heating tunnel containing a mica heating plate. The roller channel and heating tunnel are separated by a thin wall so that the heat generated by the heating plate is easily conducted to the silicone roller, whereby when a picture and an upper and a lower layers of plastic films are pressed by the heated silicone rollers, the plastic films are molten and attached on the picture to form a lamination. The laminator has a base formed with a central fixing sink which has two opposite axial notches and two circumferential slots located under and beside and communicated with the notches. One end of each of the circumferential slots has an upper window, whereby a temperature controller with two terminals is locked in the fixing sink to measure and control the temperature of the heat conductors.

1 Claim, 6 Drawing Sheets

FIG. 7 (SEC:A-A)

ial slots
LAMINATOR

BACKGROUND OF THE INVENTION

The present invention relates to an improved laminator which is easily assembled from reduced parts and manufactured at low cost while creating better laminating effect.

A conventional small type of laminator is used to heat and attach double layers of plastic films onto both sides of a picture or a photograph so as to prolong the lift of the picture or the photograph. Such conventional laminator is generally constructed and operated as follows:

Please refer to FIG. 1. The conventional laminator includes two front and two rear rollers 11, 13 and an upper and a lower heaters 12. After a picture 31 and double layers of plastic films 32 are sent into the front rollers 11, the picture 31 and the plastic films 32 are heated by the heaters 12 and then pressed by the rear rollers 13 to form a lamination structure.

FIG. 2 shows another conventional laminator in which two heating lights 14 are used to heat the surfaces of the front rollers 15. The picture and plastic films are conveyed by a conveyor 16 to be pressed by the rear rollers 17 to form the lamination structure.

FIG. 3 shows still another conventional laminator which is composed of two front rollers 18 and two rear rollers 19, wherein the front rollers 18 contain heating lights 20 for heating the front rollers 18. The heated front rollers 18 press and attach the plastic films onto the picture which is further pressed by the rear rollers 19 to completely form the lamination structure.

FIG. 4 shows still another conventional laminator including two front rollers 21 and two rear rollers 22, wherein the front rollers 21 contain electrically heating wires 23 for heating the front rollers 21. The picture 31 and double layers of plastic films 32 are heated and pressed by the front rollers 21 and then further pressed by the rear rollers. 22 to form the lamination structure.

In the above conventional laminators, the device shown in FIG. 1 conducts the heat indirectly so that the laminating effect for the picture is poor. The laminator of FIG. 2 also conducts the heat indirectly. The laminators of FIGS. 3 and 4 pertain to a type that conducts the heat directly, while it is difficult to install a temperature controller on such laminators. Therefore, it is necessary to design a relatively complicated temperature controller to measure and control the temperature. As a result, the parts of such laminators are increased and the manufacturing cost thereof is relatively high.

SUMMARY OF THE INVENTION

It is therefore a primary object of the present invention to provide an improved laminator to solve the above problems. The improved laminator includes two heat conductors each having a roller channel receiving a silicone roller and a heating tunnel containing a mica heating plate. The roller channel and heating tunnel are separated by a thin wall and only a very small clearance exists between the wall of the roller channel and the roller so that the heat generated by the heating plate is easily and quickly conducted to the silicone roller. Accordingly, when a picture and an upper and a lower layers of plastic films are pressed by the heated silicone rollers, the plastic films are quickly molten and fixedly attached on the picture to form a lamination. In addition, the laminator has a base formed with a central fixing sink. The fixing sink receives a spring and has two opposite axial notches and two circumferential slots located under and beside and communicated with the notches. One end of each of the circumferential slots has an upper window, whereby two terminals of a temperature controller is first vertically placed into the notches and then rotated through the slots toward the windows. At this time, the spring upward pushes a bottom of the temperature controller, making the terminals thereof enter the windows and thus fix the temperature controller in the fixing sink. The temperature controller is thus located at a central portion of the base and contacts with the heat conductor so as to accurately measure and control the temperature thereof.

The present invention can be best understood through the following description and accompanying drawing, wherein:

DETAILED DESCRIPTION OF THE PREFERRED EMBODIMENT

Figure 1:
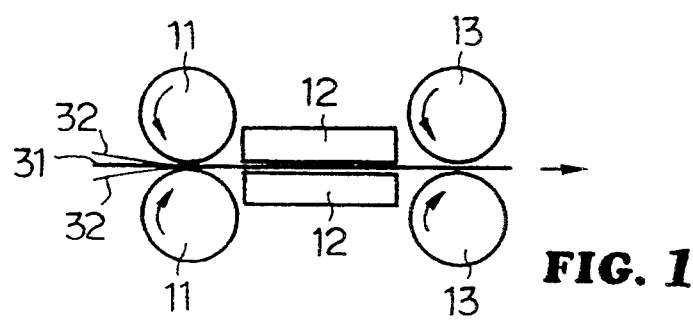
FIGS. 1 to 4 show the conveying and heating operation of four conventional small type of laminators.
Figure 2:
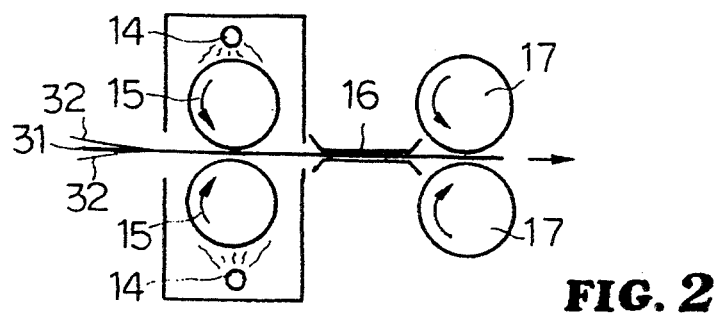
Figure 3:
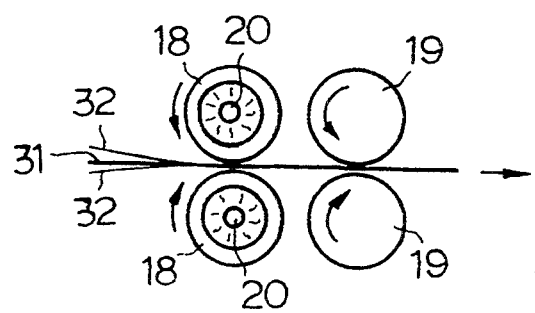
Figure 4:
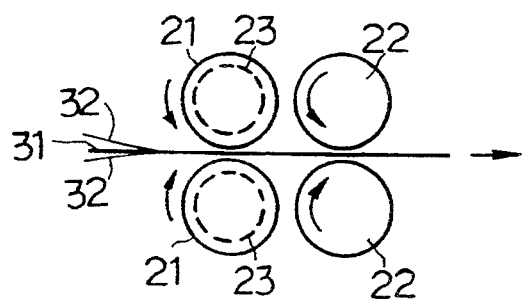
Figure 5:
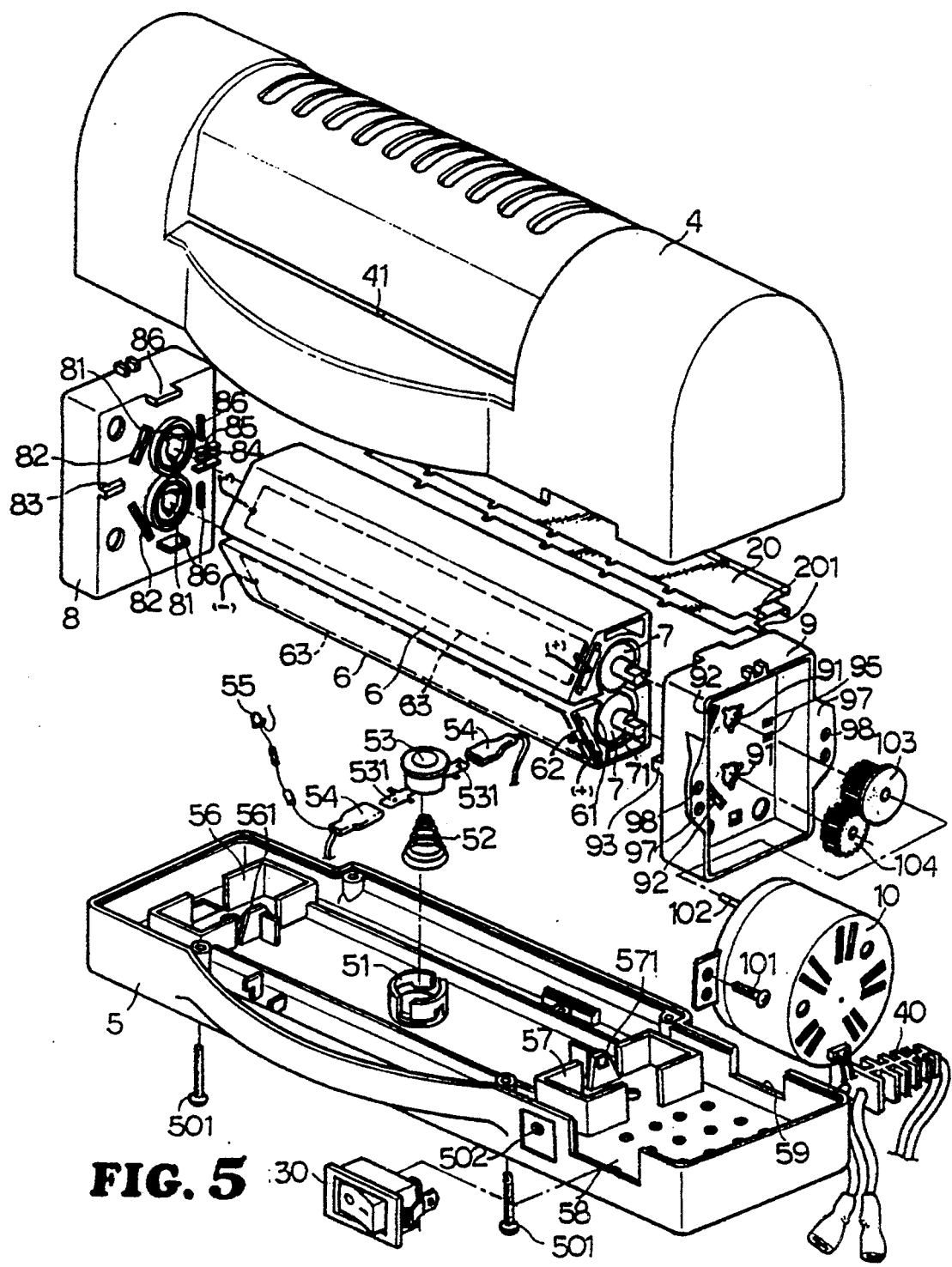
FIG. 5 is a perspective exploded view of the present invention.

Please refer to FIG. 5. The laminator of the present invention includes an upper cover 4, a base 5 associated with the upper cover 4 by four screws 501, an upper and a lower heat conductors 6 which are symmetrical to each other, two silicone rollers 7 disposed in the heat conductors 6 respectively, a left and a right supports 8, 9, a reduced motor 10, a first and a second gears 103, 104 which mesh with each other, an upper and a lower clamping plates 20 which are symmetrical to each other and have lateral protrusions 201 respectively, a switch 30 fixed in a first notch 58 formed on a front lateral side of the base 5, and a power connector 40 fixed in a second notch 59 formed on a rear lateral side of the base 5.

Figure 6:
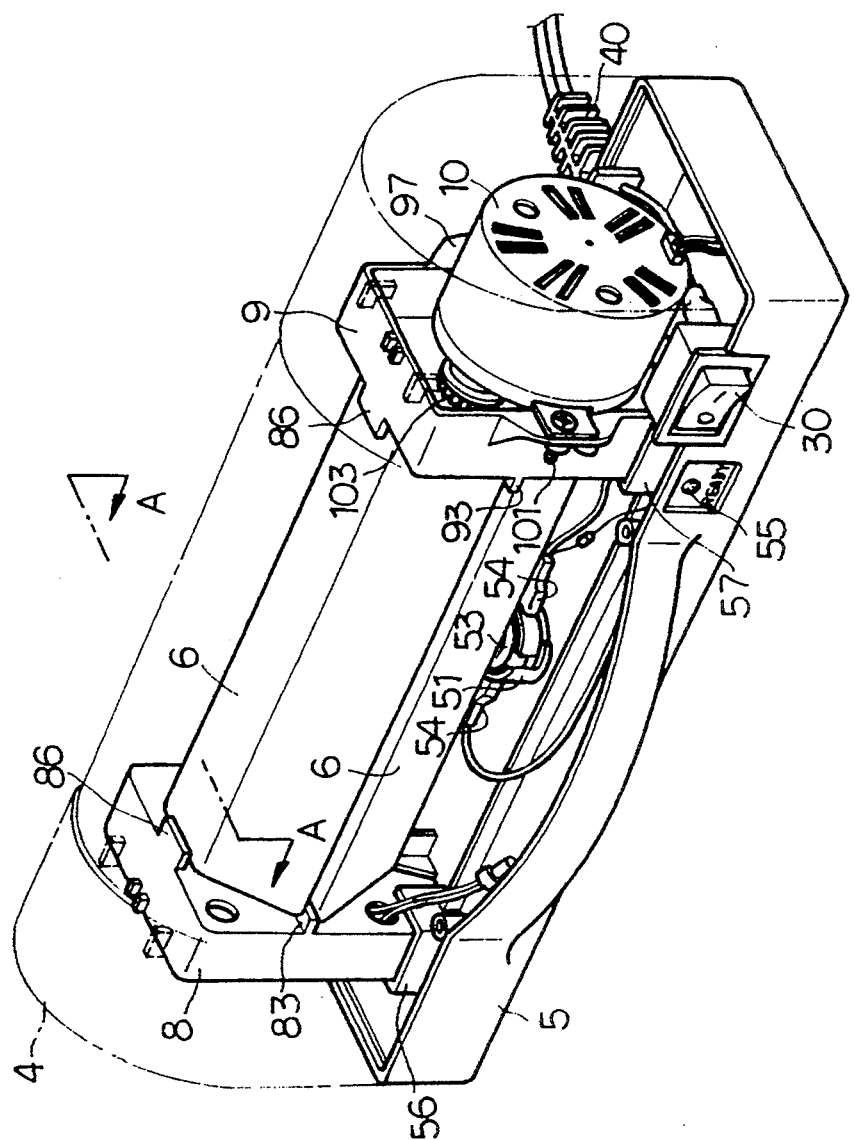
FIG. 6 is a perspective assembled view thereof.
Figure 7:
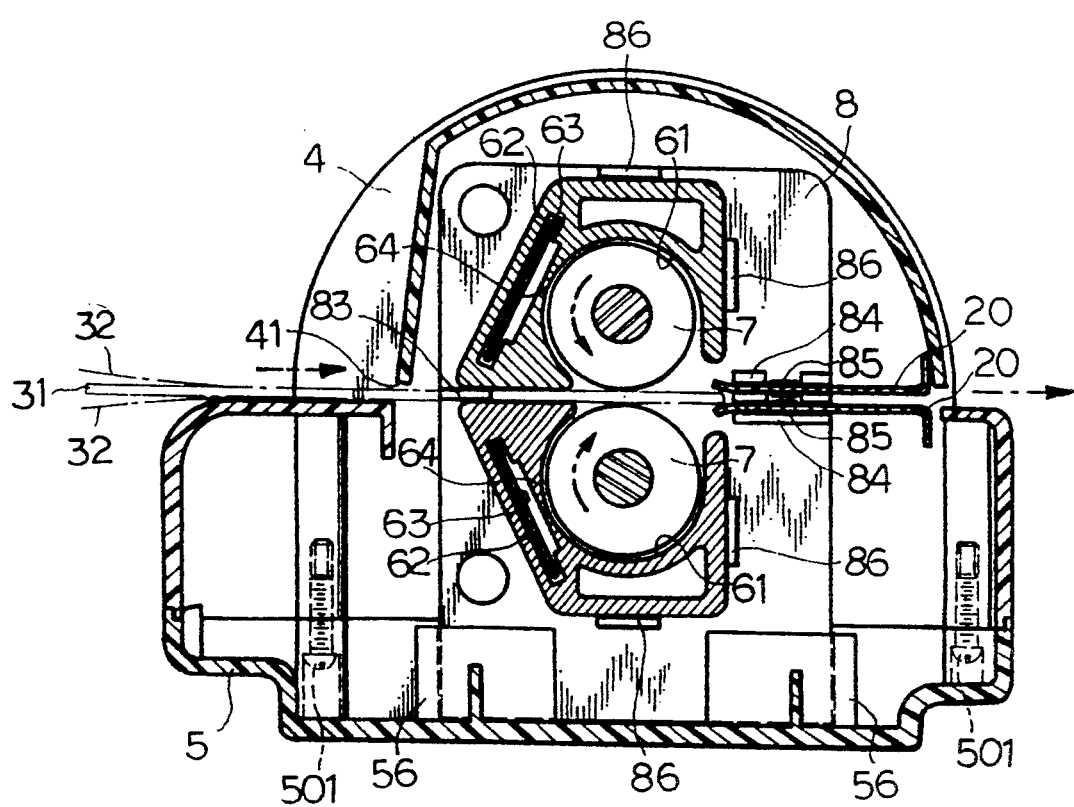
FIG. 7 is a sectional view taken along line A—A of FIG. 6.

The upper cover 4 has an entrance slit 41, whereby a picture or a photograph accompanied by an upper and a lower layers of plastic films can be inserted through the slit 41 into the laminator. The base 5 has a left and a right projecting frame portions 56, 57 which are provided with triangular locking hooks 561, 571 respectively for firmly fixing the supports 8, 9 therein (as showin in FIG. 6). Each of the supports 8, 9 has an upper and a lower shaft holes 81, 91, two slant slots 82, 92 beside the shaft holes 81, 91, a front projection 83, 93 located near a front middle portion of each support 8, 9, three rows of rear projections 84, 94 and four engaging blocks 86, 96 located on an upper, a lower and a rear sides of each support 8, 9 for fixedly framing the heat conductors 6 without displacement thereof as shown in FIG. 7. The upper and lower heat conductors 6 are separated from each other by the front projections 83, 93. Two pits 85, 95 are formed between the three rows of rear projections 84, 94, whereby the upper and lower clamping plates 20 can be fixedly clamped between the rear projections 84, 94 with the lateral protrusions 201 of the upper and lower clamping plates 20 inserted in the pits 85, 95 as shown in FIG. 7.

The right support 9 has two lug portions 97 formed with thread holes 98, whereby screws 101 can be screwed into the thread holes 98 to fixedly mount the reduced motor 10 on the right support 9.

Please refer to FIG. 7. The heat conductor 6 is made of an aluminum alloy having good heat conductivity. The heat conductor 6 includes a roller channel 61 receiving the silicone roller 7 and a slant heating tunnel 62 spaced from the roller channel 61 by a thin wall 64 with a thickness of 0.5–1 mm. A strip-like mica heating plate 63 is disposed in the heating tunnel 62. Two ends of the heating plate 63 are provided with positive and negative power wires which pass through the slots 82, 92 of the left and right supports 8, 9 respectively. The heat generated by the heating plate 63 is conducted by the heat conductor 6 to the silicone roller 7, whereby when a picture or a photograph 31 and an upper and a lower plastic films 32 are sent to the rollers 7 and heated and pressed thereby, the photograph 31 and the plastic films 32 are laminated together. As previously described, the heating tunnel 62 and the roller channel 61 are separated by the thin wall 64 with 0.5–1 mm thickness. In addition, only a very small clearance exists between the wall of the roller channel 61 and the roller 7. Therefore, the heat generated by the mica heating plate 63 can be easily conducted through the thin wall 64 to the roller 7.

The roller 7 has a central shaft 71 two ends of which are inserted in the shaft holes 81, 91 of the left and right supports 8, 9. The first and second gears 103, 104 are rotatably disposed at one of the two ends of the central shaft 71 of each roller 7 and mesh with each other. The first gear 103 is further connected with a rotary shaft 102 of the motor 10, whereby when the rotary shaft 102 rotates, the two silicone rollers 7 will be driven to rotate. It should be noted that the silicone rollers 7, first and second gears 103, 104 and the rotary shaft 102 are all concentric with the shaft holes 81, 91 of the supports 8, 9 and the interval between the two rollers 7 is equal to that between the two gears 103, 104. Therefore, the occurrence of thermal expansion of the rollers 7 will not lead to any error of operation.

Figure 8:
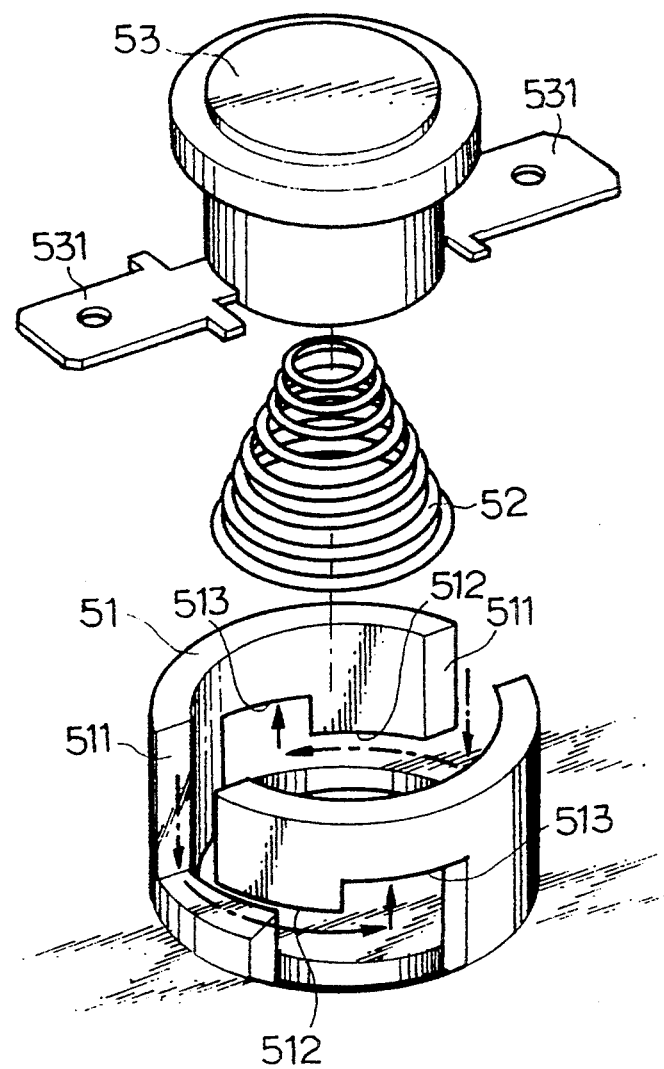
FIG. 8 is an enlarged exploded view showing the fixing sink of the base, the spring and the temperature controller of the present invention.
Figure 9:
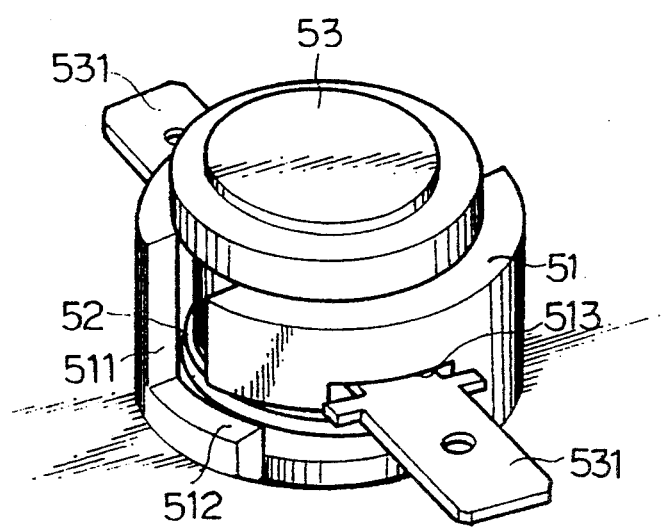
FIG. 9 shows the fixing sink, the spring, and the temperature controller in an assembled configuration.

FIG. 5 shows that the base 5 has a central fixing sink 51 and a conic coil spring 52 and a temperature controller 53 are disposed in the fixing sink 51. As shown in FIG. 8, the fixing sink 51 has two opposite axial notches 511 and two circumferential slots 512 located under and beside and communicated with the notches 511. One end of each slot 512 has an upper window 513, whereby two terminals 531 of the temperature controller 53 can be first vertically placed into the notches 511 and then rotated through the slots 512 toward the windows 513. At this time, the spring 52 upward pushes a bottom of the temperature controller 53, making the terminals 531 thereof enter the windows 513 as shown in FIG. 9. Therefore, the temperature controller 53 is prevented from detaching from the fixing sink 51 and a top surface of the temperature controller 53 can contact with one of the heat conductors 6 to accurately measure and control the temperature thereof.

The two terminals 531 of the temperature controller 53 are connected with power terminals 54 one of which is connected with an LED indicator 55. The LED indicator 55 is disposed in a small hole 502 formed on a front wall of the base 5 for indicating the power on state of the laminator.

According to the above arrangements, the temperature controller 53 can accurately measure and control the temperature of the silicone rollers 7 and a good heat conduction relationship between the silicone rollers 7 and the heating plates 63 can be achieved. so as to create a reliable laminating effect.

It is to be understood that the above description and drawings are only used for illustrating one embodiment of the present invention, not intended to limit the scope thereof. Any variation and derivation from the above description and drawings should be included in the scope of the present invention.

What is claimed is:

1. A laminator comprising:

a base having two projecting frame portions located at two ends thereof, a central fixing sink, a small hole formed on a front wall of said base for receiving an LED indicator, a front notch for receiving a power switch and a rear notch for receiving a power connector;

an upper cover having a front entrance slit and associated with said base;

a left and a right supports fitted in said projecting frame portions of said base respectively, each of said supports having an upper and a lower shaft holes, two slant slots, a front projection, three rows of rear projections and four engaging blocks located along a periphery of each support, one of said supports having two lateral lug portions formed with thread holes;

an upper and a lower heat conductors fixedly supported by said left and right supports, each of said heat conductors containing a silicone roller and a mica heating plate;

a reduced motor having a rotary shaft;

a first gear connected with said rotary shaft of said motor and a second gear meshing with said first gear, said first and second gears being engaged with said two silicone rollers respectively;

two clamping plates disposed between said left and right supports for guiding a laminated picture or photograph out of said laminator; and a temperature controller having two opposite terminals and a spring disposed in said fixing sink of said base, a top surface of said temperature controller contacting with a bottom surface of one of said heat conductors, said laminator being characterized in that said heat conductor is made of an aluminum alloy having good heat conductivity and includes a roller channel receiving said silicone roller and a slant heating tunnel spaced from said roller channel by a thin wall, a mica heating plate being disposed in said heating tunnel and a very small clearance existing between inner wall surface of said roller channel and said roller, power wires being connected with two ends of each heating plate and extending therefrom through said slant slots of said left and right supports, said fixing sink having two opposite axial notches and two circumferential slots located under and beside and communicated with said notches, one end of each of said circumferential slots having an upper window, whereby the two terminals of said temperature controller is first vertically placed into said axial notches and then rotated through said slots toward said windows and said spring thus upward pushes said temperature controller, making said terminals thereof enter said windows and locked therein.

* * * * *